United States Patent [19]
Kamiyama et al.

[11] Patent Number: 5,195,177
[45] Date of Patent: Mar. 16, 1993

[54] CLIPPING PROCESSOR

[75] Inventors: Hiroshi Kamiyama; Koichi Horiuchi, both of Osaka, Japan

[73] Assignee: Matsushita Electric Industrial Co., Ltd., Osaka, Japan

[21] Appl. No.: 565,393

[22] Filed: Aug. 10, 1990

[30] Foreign Application Priority Data

Sep. 8, 1989 [JP] Japan .................................. 1-233235

[51] Int. Cl.⁵ ............................................ G06F 15/72
[52] U.S. Cl. ..................... 395/134; 395/133; 395/162; 340/747; 340/750
[58] Field of Search ................. 364/518, 521, 522; 340/747, 750; 395/133, 134, 162

[56] References Cited

U.S. PATENT DOCUMENTS 5,117,485 5/1992 Malachowsky et al. .......... 395/134
5,133,049 7/1992 Cain et al. ........................... 395/133

FOREIGN PATENT DOCUMENTS

0243051 10/1987 European Pat. Off. .
63-306767 12/1988 Japan .

Primary Examiner—Gary V. Harkcom
Assistant Examiner—Phu K. Nguyen
Attorney, Agent, or Firm—Lowe, Price, LeBlanc & Becker

[57] ABSTRACT

A clipping processor capable of setting a clipping area, which has a shape not restricted to a rectangle and is defined in the processing of transferring data on a part of a clipping area in each raster by computing data defining the clipping area by two function generation circuits or by reading the data defining the clipping area from the clipping area memory, in which data defining a part of the clipping area in each raster is preliminarily stored, every time the raster is updated.

3 Claims, 6 Drawing Sheets

DRAWING AREA IS INSIDE
CLIPPING AREA

FIG. 8(b)

DRAWING AREA IS OUTSIDE
CLIPPING AREA

CLIPPING PROCESSOR

BACKGROUND OF THE INVENTION

1. Field of the Invention

This invention relates to a clipping processor for use in a graphics processing system for drawing and displaying graphic forms.

2. Description of the Related Art

Figure 7:
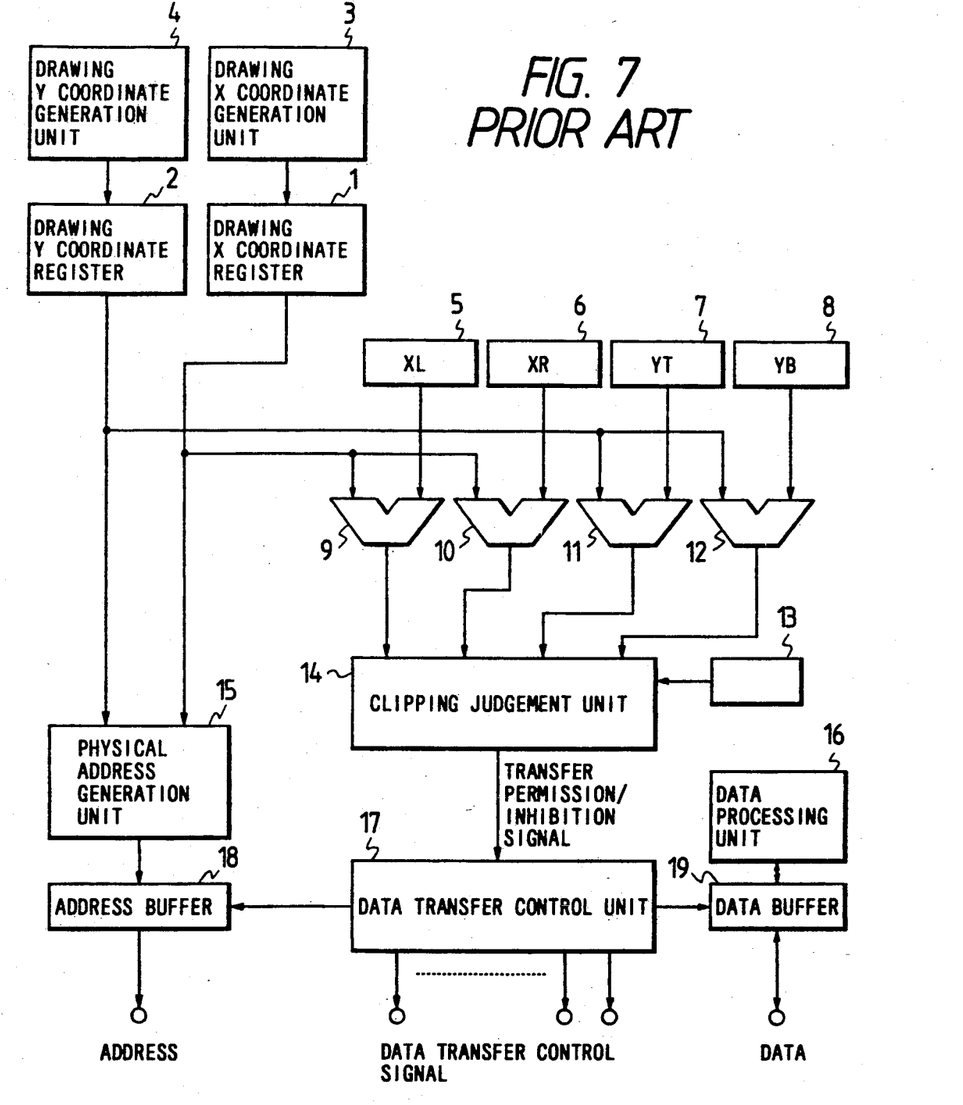
FIG. 7 is a schematic block diagram for showing the construction of a prior art clipping processor of the present invention.

Referring first to FIG. 7, there is shown the construction of a prior art clipping processor. In FIG. 7, reference numerals 1 and 2 designate a drawing X coordinate register for storing X coordinates and a drawing Y coordinate register for storing Y coordinates, respectively; 3 and 4 a drawing X coordinate generation unit for computing X coordinates to be drawn and a drawing Y coordinate generation unit for computing Y coordinates to be drawn; 5 and 6 two clipping X coordinate registers, which are respectively used to store an X coordinate of a left end of an area to be clipped and an X coordinate of a right end of the area to be clipped; and 7 and 8 two clipping Y coordinate registers, which are respectively used to store a Y coordinate of a top end of the area to be clipped and a Y coordinate of a bottom end of the area to be clipped. Further, reference numeral 9 denotes a comparator for comparing the contents of the drawing X coordinate register 1 with those of the clipping X coordinate register 5; 10 a comparator for comparing the contents of the drawing X coordinate register 1 with those of the clipping X coordinate register 6; 11 a comparator for comparing the contents of the drawing Y coordinate register 2 with those of the clipping Y coordinate register 7; 12 a comparator for comparing the contents of the drawing Y coordinate register 2 with those of the clipping Y coordinate register 8; 13 a drawing area definition flag setting device for setting a drawing area definition flag indicating that an area to be drawn (hereunder sometimes referred to as a drawing area) is inside or outside the area to be clipped; 14 a clipping judgement unit for judging from the results of the comparisons made by the comparators 9-12 and the contents of the drawing area definition flag setting device 13 that the drawing should be permitted or inhibited; 15 a physical address generation unit for computing addresses, which correspond to X and Y coordinates determined by the drawing X coordinate register 1 and the drawing Y coordinate register 2, in an external storage (not shown); 16 a data processing unit for processing and generating graphic data used for drawing; 17 a data transfer control unit for controlling data transfer between the clipping processor and an external circuit (not shown); 18 an address buffer for outputting the addresses, which are computed by the physical address generation unit 15, to the external storage under the control of the data transfer control unit 17; and 19 a data buffer for performing data input-/output between the external storage and the data processing unit 16 under the control of the data transfer control unit 17.

When a part or all of a graphic form to be drawn is clipped by the clipping processor constructed as above described, first, the X coordinates of the right end and the left end of the area to be clipped and the Y coordinates of the top end and the bottom end of the area to be clipped are respectively set in the clipping X coordinates register and the clipping Y coordinate register and further information, which indicates that the area to be drawn is inside or outside the area to be clipped, is set in the drawing area definition flag stored in the device 13 before drawing the graphic form.

Figure 8A:
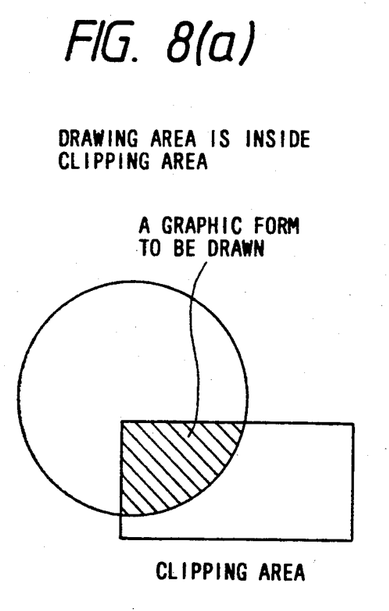
FIG. 8 is a diagram for illustrating the processing of clipping an area by using a rectangular clipping area.
Figure 8B:
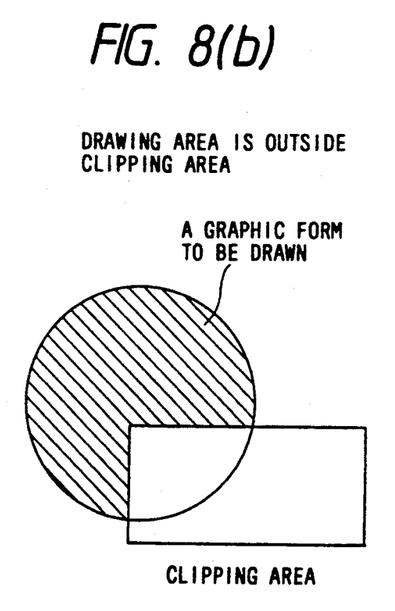

Thereafter, when the drawing of the graphic form is started, the coordinates of the graphic form to be drawn are sequentially generated in the drawing X coordinate generation unit 3 and the drawing Y coordinate generation unit 4 and the thus generated coordinates are stored in the drawing X coordinate register 1 and the drawing Y coordinate register 2. Subsequently, the clipping judgement unit 14 judges from the results of the comparisons made by the comparators 9-12 and the contents of the drawing area definition flag setting device 13 that the drawing should be permitted or inhibited, and outputs a control signal to the data transfer control unit 17. In case where the data transfer is permitted, physical addresses generated by the physical address generation unit 15, which correspond to the contents of the drawing X coordinate register 1 and the drawing Y coordinate register 2, are output through the address buffer 18. Further, the external storage and the data processing unit 16 perform input/output operations by way of the data buffer 19. In contrast with this, in case where the data transfer is inhibited by the clipping judgement unit 14, the data transfer is not effected at all and thus the contents of the external storage is not updated. FIG. 8 shows the results of the clipping processing in case of drawing a circle as an example of the above described processing.

Figure 2:
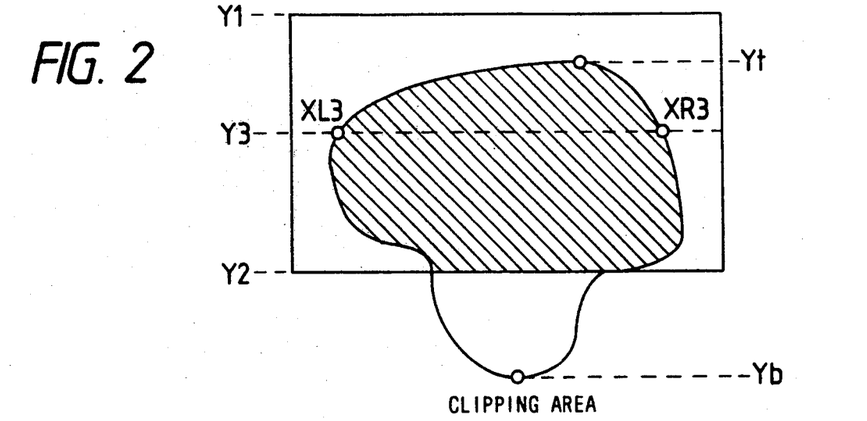
FIG. 2 is a diagram for illustrating the clipping processing by using a clipping area defined by a curve.

However, in the above described prior art clipping processor, the area to be clipped is preliminarily defined and established by using the coordinates stored in four registers, i.e., the clipping X coordinate register 5 and 6 and the clipping Y coordinate register 7 and 8. This results in that in case of the prior art clipping processor, an area to be clipped (hereunder sometimes referred to simply as a clipping area) is limited to rectangular one. Therefore, in case where the clipping processing is performed by using an area defined by a curve, as illustrated in FIG. 2, as a clipping area, the data transfer can be effected only after graphic data on a clipped graphic form is preliminarily generated by using a work area, which is set in the storage separately from data areas used for processing the graphic data on the graphic form to be drawn. Thus, the prior art clipping processor has drawbacks that the data transfer takes time and that the work area is necessary.

The present invention is accomplished to obviate the drawbacks of the prior art clipping processors.

SUMMARY OF THE INVENTION

It is an object of the subject invention to provide a clipping processor which can set a clipping area having a shape unrestricted to a rectangular one by using a function generation circuit for computing coordinate data representing the shape of the clipping area in the processing of transferring data on a part of a graphic form to be drawn and clipped on each of horizontal lines (hereunder sometimes referred to as rasters).

To achieve the foregoing object and in accordance with a first aspect of the present invention, there is provided a clipping processor which comprises a drawing X coordinate generation unit for generating X coordinates of a part of the graphic form to be drawn on each raster and two function generation circuits for generating two X coordinates defining a part of a clipping area on each raster, whereby the coordinates defining a part of the graphic form to be drawn and of the clipping area are serially generated every time the raster is updated, and clipping processing is performed in the areas defined by the function generation circuits.

Further, it is another of the subject invention to provide a clipping processor which can set a clipping area by defining by using a digital differential analyzer (hereunder referred to as a DDA circuit) every time the raster is updated, and thereby a clipping area, of which the shape is not restricted to a rectangle, can be set.

To achieve this object and in accordance with a second aspect of the present invention, there is provided a clipping processor which comprises a drawing X coordinate generation unit and two DDA circuits for generating two X coordinates defining a part of a clipping area on each raster, whereby the coordinates defining a part of the graphic form to be drawn and of the clipping area are serially generated every time the raster is updated, and clipping processing is performed in the areas defined by the DDA circuits.

Furthermore, it is still another object of the present invention to provide a clipping processor which can set a clipping area by reading information, which is preliminarily stored in a clipping area memory, defining a part of the clipping area on each raster from the clipping area memory or by defining the clipping area by using function generation circuits every time the raster is updated, and thereby a clipping area, of which the shape is not restricted to a rectangle, can be set.

To achieve the foregoing object and in accordance with a third aspect of the present invention, there is provided a clipping processor which comprises a drawing X coordinate generation unit for generating X coordinates of a part of the graphic form to be drawn on each raster, two function generation circuits for generating two X coordinates defining a part of a clipping area on each raster and a clipping area memory for storing information defining a part of the clipping area on each raster, whereby the coordinates defining a part of the graphic form to be drawn is generated every time the raster is updated, and one of output data of the function generation circuits and an output of the clipping area memory is selected, and clipping processing is performed in any area thus set.

Thereby, the clipping processor of the present invention can set a clipping area of which the shape is restricted to a rectangle. Nowadays, high speed processing and capability of performing high-level functions are required of a graphic processing system. Therefore, the clipping processor of the present invention is very advantageous for practical use in that the clipping processing can be effected at a high speed by using hardware and an arbitrary clipping area.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiment of the present invention will be described in detail by referring to the accompanying drawings.

Figure 1:
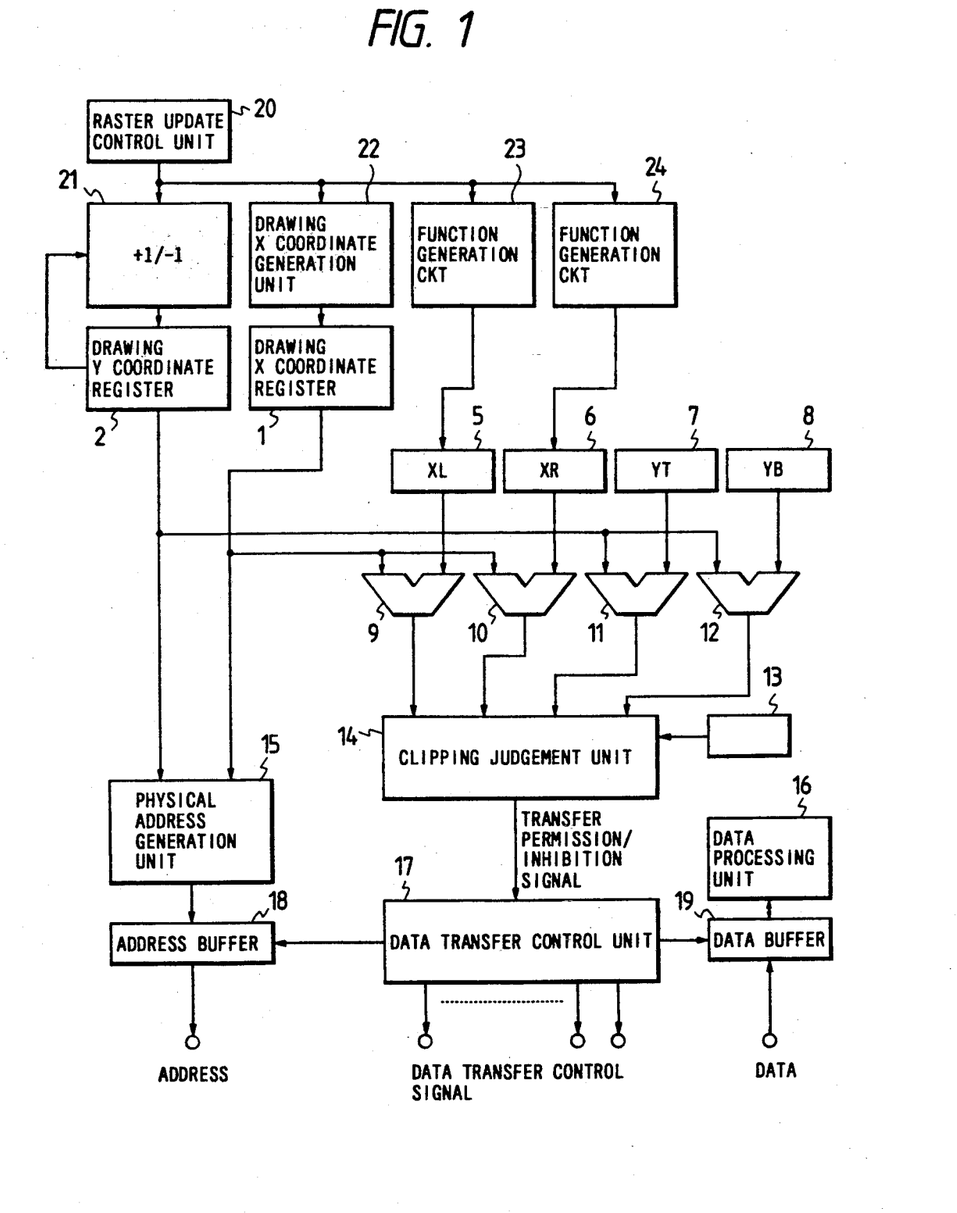
FIG. 1 is a schematic block diagram for showing the construction of a first embodiment of the present invention.

Referring first to FIG. 1, there is shown a clipping processor embodying the present invention, i.e., a first embodiment of the present invention. In this figure, reference numeral 1 designates a drawing X coordinate register; 2 a drawing Y coordinate register; 5 and 6 clipping X coordinate registers; 7 and 8 clipping Y coordinate registers 9 thru 12 comparators; 13 a drawing area definition flag setting device; 14 a clipping judgement unit; 15 a physical address generation unit; 16 a data processing unit; 17 a data transfer control unit; 18 an address buffer; and 19 a data buffer. These composing elements are the same as shown in FIG. 7. Further, reference numeral 20 denotes a raster update control unit for controlling the updating of a raster; 21 an incrementer/decrementer for incrementing or decrementing the contents of the drawing Y coordinate register 2 by one; 22 a drawing X coordinate generation unit for generating new X coordinates at the time of updating the raster and for updating X coordinates during the drawing of a part of a graphic form on a raster; and 23 and 24 function generation circuits for generating new X coordinates at the time of updating the raster.

An operation of this embodiment constructed as above described will be explained by giving an example, in which the clipping processing is effected by using a clipping area defined by a curve illustrated in FIG. 2 and the inside of the clipped area is drawn or filled. Before drawing the graphic form, Y coordinates (Yt, Yb) of boundaries of the clipping area are set in the clipping Y coordinate registers 7 and 8. Further, it is set that the function generation circuits 23 and 24 respectively generate a left-hand curve drawn between boundary points corresponding to the Y coordinates Yt and Yb and a right-hand curve drawn between the boundary points corresponding to the Y coordinates Yt and Yb, as viewed in FIG. 2. Furthermore, the drawing area definition flag stored in the device 13 is set in such a manner to indicate that the drawing area is inside the clipping area.

Next, assuming that the drawing of the graphic form is effected by serially updating rasters from a top end of the drawing are to a bottom end thereof and the contents of the drawing Y coordinate register 2 indicates a Y coordinate Y1, the drawing of the graphic form is started from a raster corresponding to the Y coordinate Y1. (Here, it is supposed that as a position becomes lower in this figure, Y coordinate of the position increases in value.) At that time, the drawing of the graphic form is inhibited by the clipping judgment unit 14 and the external storage or memory is not accessed at all because the Y coordinate Y1 is less than that indicated by the contents of the clipping Y coordinate register 7. Further, the updating of the raster is controlled by the raster update control unit 20. On the other hand, the Y coordinates are serially updated by the incrementer/decrementer 21, and the contents of the drawing X coordinate register 1 is updated by the drawing X coordinate generation unit 22. When the Y coordinate becomes equal to Yt, the two function generation circuits 23 and 24 is activated. After that, X coordinates corresponding to the raster, which is being currently processed, are calculated by the two function generation circuits 23 and 24 and the calculated X coordinates are respectively stored in the X coordinate registers 5 and 6. Taking notice of a raster of which the Y coordinate is equal to Y3, an X coordinate XL3 is given by the function generation circuit 23 and the X coordinate XR3 is given by the function generation circuit 24. Further, the clipping judgement unit 14 judges that the range of the X coordinate of a portion, which can be drawn, is XL3 to XR3, and permits the drawing of only a part of the graphic form having the X coordinate of this range. Thus, the clipping processing on this raster is completed.

Upon completion of the processing of clipping a part of the graphic form on a raster, the raster update control unit 20 outputs an update control signal for the next raster. The drawing X coordinate generation unit 22 and the incrementer/decrementer compute new drawing coordinates in response to this signal. Further, the two function generation circuits 23 and 24 calculates new clipping X coordinates, and the clipping processing on a raster is performed once again for the next raster. The processing of clipping the graphic form to be drawn is completely effected by performing the above described clipping processing on a raster on all of the rasters. Consequently, the clipping processing in the area defined by the curve is finished.

As above described, this embodiment of the present invention can perform the clipping processing in an area defined by curves, which are represented by functions generated by the function generation circuits 23 and 24, by providing function generation circuits 23 and 24 therein and sequentially computing coordinates defining a part of the clipping area on each raster by using the function generation circuits every time the raster is updated.

Figure 3:
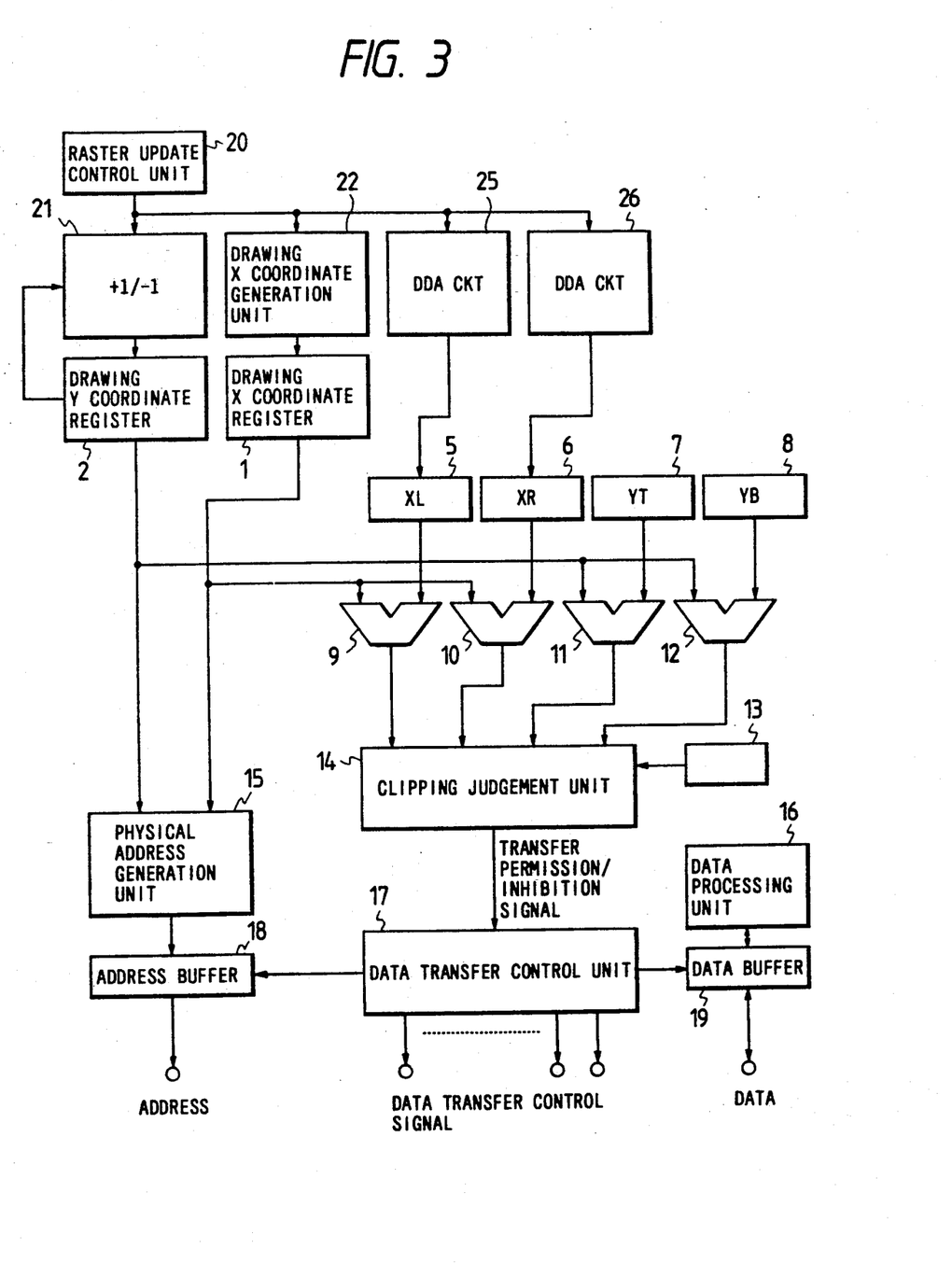
FIG. 3 is a schematic block diagram for showing the construction of a second embodiment of the present invention.

Referring next to FIG. 3, there is shown another clipping processor embodying the present invention, i.e., the second embodiment of the present invention. In this embodiment, the DDA circuits are employed as the function generation circuits of the first embodiment. In FIG. 3, reference numeral 1 designates a drawing X coordinate register; 2 a drawing Y coordinate register; 5 and 6 clipping X coordinate registers; 7 and 8 clipping Y coordinate registers 9 thru 12 comparators; 13 a drawing area definition flag setting device; 14 a clipping judgement unit; 15 a physical address generation unit; 16 a data processing unit; 17 a data transfer control unit; 18 and address buffer; and 19 a data buffer. These elements are the same as shown in FIG. 7. Further, reference numeral 20 denotes a raster update control unit for controlling the updating of a raster; 21 an incrementer/decrementer for incrementing or decrementing the contents of the drawing Y coordinate register 2 by one; 22 a drawing X coordinate generation unit for generating new X coordinates at the time of updating the raster and for updating X coordinates during the drawing of a part of a graphic form on a raster; and 25 and 26 DDA circuits for generating new X coordinates at the time of updating the raster.

Figure 4:
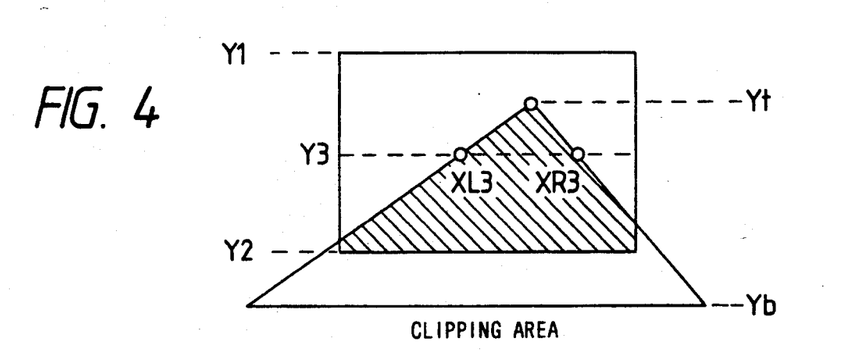
FIG. 4 is a diagram for illustrating the processing of clipping an area by using a triangular clipping area.

An operation of this embodiment constructed as above described will be explained by giving an example, in which the clipping processing is effected by using a triangular area illustrated in FIG. 4 as a clipping area and the inside of the clipped area is drawn. Before drawing the graphic form, Y coordinates (Yt, Yb) of boundaries of the clipping area are set in the clipping Y coordinate registers 7 and 8. Further, it is set that the DDA circuits 25 and 26 respectively generate a left-hand and right-hand sides of the triangular area. Furthermore, the drawing area definition flag stored in the device 13 is set in such a manner to indicate that the drawing area is inside the clipping area.

Next, assuming that the drawing of the graphic form is effected by serially updating rasters from a top end of the drawing area to a bottom end thereof and the contents of the drawing Y coordinate register 2 indicates a Y coordinate Y1, the drawing of the graphic form is started from a raster corresponding to the Y coordinate Y1. (Similarly as in case of FIG. 2, it is supposed that as a position becomes lower in FIG. 3, Y coordinate of the position increases in value.) At the time, the drawing of the graphic form is inhibited by the clipping judgement unit 14 and the external storage or memory is not accessed at all because the Y coordinate Y1 is less than that indicated by the contents of the clipping Y coordinate register 7. Further, the updating of the raster is controlled by the raster update control unit 20. On the other hand, the Y coordinates are serially updated by the incrementer/decrementer 21, and the contents of the drawing X coordinate register 1 is updated by the drawing X coordinate generation unit 22. When the Y coordinate becomes equal to Yt, the two DDA circuits 15 and 26 are activated. After that, X coordinates corresponding to the raster, which is being currently processed, are calculated by the two DDA circuits 25 and 26 and the calculated X coordinates area respectively stored in the X coordinate registers 5 and 6. Taking notice of a raster of which the Y coordinate is equal to Y3, and X coordinate XL3 is given by the DDA circuit 25 and the X coordinate XR3 is given by the DDA circuit 26. Further, the clipping judgement unit 14 judges that the range of the X coordinate of a portion, which can be drawn, is XL3 to XR3, and permits the drawing of only a part of the graphic form having the X coordinate of this range. Thus, the clipping processing on this raster is completed.

Upon completion of the processing of clipping a part of the graphic form on a raster, and the raster update control unit 20 outputs an update control signal for the next raster. The drawing X coordinate generation unit 22 and the incrementer/decrementer compute new drawing coordinates from this signal. Further, the two DDA circuits 25 and 26 calculates new clipping X coordinates, and the clipping processing on a raster is performed once again for the next raster. The processing of clipping the graphic form to be drawn is completely effected by performing the above described clipping processing on a raster on all of the rasters. Consequently, the processing of clipping the graphic by using the triangular clipping area is completed.

Figure 5:
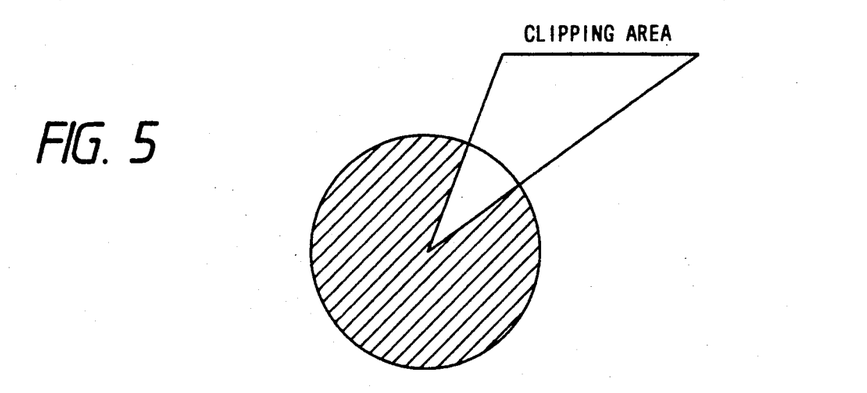
FIG. 5 is a diagram for illustrating the processing of filling a fan-shaped area by clipping a circular fill area (i.e., a circular area to be filled) against a triangular clipping area.

As above described, this embodiment of the present invention can perform the processing of clipping the graphic form by using the triangular area defined by the DDA circuits 25 and 26, by providing the DDA circuits 25 and 26 therein and sequentially computing coordinates defining a part of the clipping area on each raster by using the DDA circuits every time the raster is updated. Further, in case of this embodiment, a fan-shaped area can be easily filled by clipping a circular fill area against a triangular clipping area as illustrated in FIG. 5.

Figure 6:
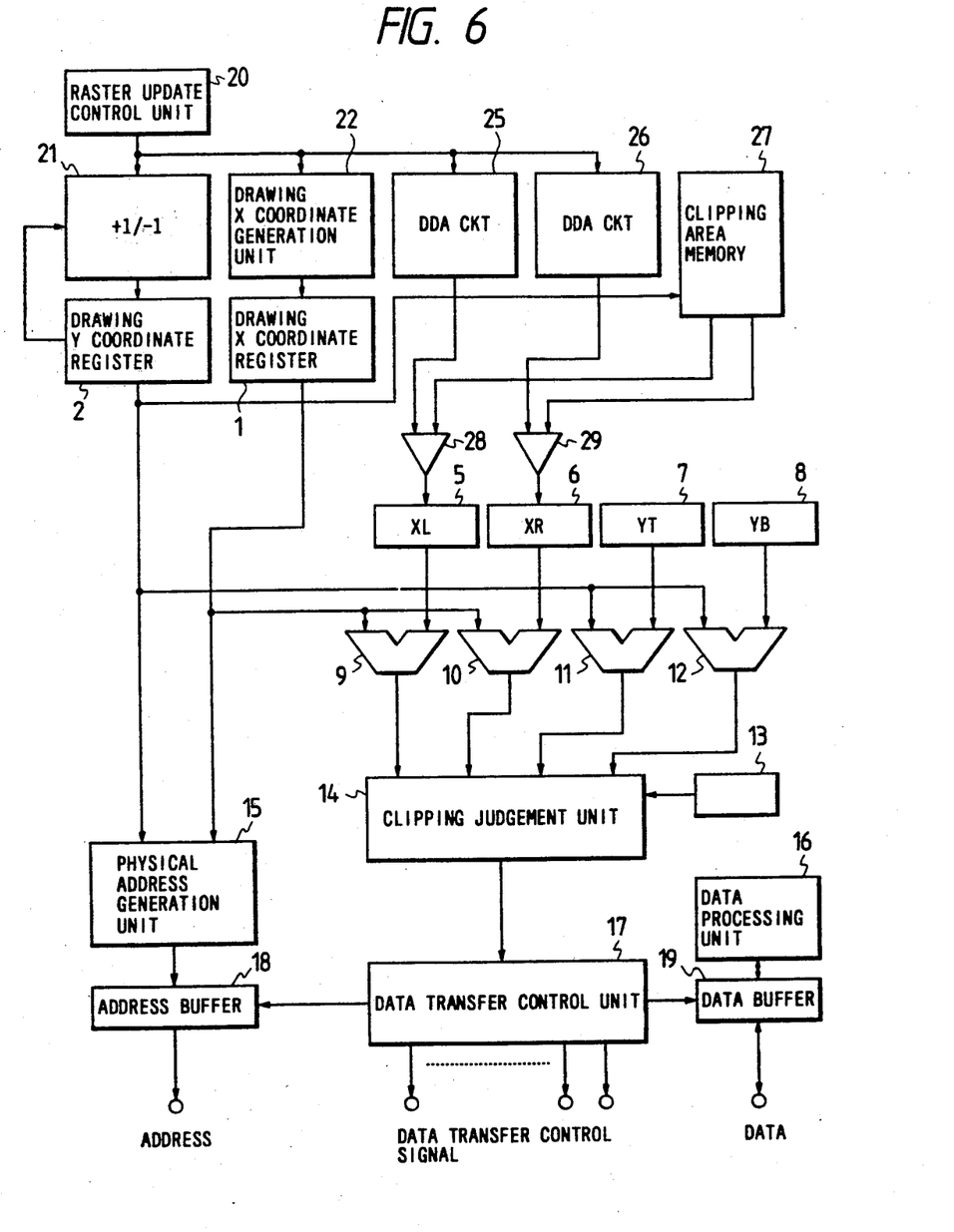
FIG. 6 is a schematic block diagram for showing the construction of a third embodiment of the present invention.

Next, turning now to FIG. 6, there is shown still another clipping processor embodying the present invention, i.e., the third embodiment of the present invention. In this embodiment, the DDA circuits are used as the function generation circuits. In FIG. 6, reference numeral 1 designates a drawing X coordinate register; 2 a drawing Y coordinate register; 5 and 6 clipping X coordinate registers; 7 and 8 clipping Y coordinate registers; 9 thru 12 comparators; 13 a drawing area definition flag setting device; 14 a clipping judgement unit; 15 a physical address generation unit; 16 a data processing unit; 17 a data transfer control unit; 18 an address buffer; and 19 a data buffer. These composing elements are the same as shown in FIG. 7. Further, reference numeral 20 denotes a raster update control unit for controlling the updating of a raster; 21 an incrementer/decrementer; and 22 a drawing X coordinate generation unit. These composing elements are the same as illustrated in FIG. 1. Moreover, reference numerals 25 and 26 designate DDA circuits which are the same as shown in FIG. 3. Furthermore, reference numeral 27 indicates a clipping area memory for storing two X coordinates defining a part of the clipping area on each raster; 28 a selector for inputting one of two X coordinates output from the clipping area memory 27 and also inputting an output of the DDA circuit 25 and selectively outputting one of the inputted X coordinate and the output of the DDA circuit 25 to the clipping X coordinate register 5; and 29 another selector for inputting the X coordinate, which is not inputted to the selector 28, outputted from the clipping area memory 27 and also inputting an output of the DDA circuit 26 and selectively outputting one of the inputted X coordinate and the output of the DDA circuit 26 to the clipping X coordinate register 6.

Hereinafter, an operation of this embodiment will be described in detail. First, an operation of clipping a graphic form in an area generated or defined by the DDA circuits as illustrated in FIG. 4 is the very same as explained in the description of the second embodiment of FIG. 3. Thus, operations of clipping a graphic form against a clipping area defined by a curve as illustrated in FIG. 2 and of drawing or filling the inside of clipped graphic form will be described hereinbelow. Before drawing the graphic form, Y coordinates (Yt, Yb) of boundaries of the clipping area are set in the clipping Y coordinate registers 7 and 8. Further, the drawing area definition flag stored in the device 13 is set in such a manner to indicate that the drawing area is inside the clipping area. Furthermore, sequences of X coordinates respectively representing a left-hand curve draw between boundary points corresponding to the Y coordinates Yt and Yb and a right-hand curve drawn between the boundary points corresponding to the Y coordinates Yt and Yb are set in the clipping area memory 27 and the selectors 28 and 29 are set in such a manner to select and output the output the clipping area memory 27.

Next, assuming that the drawing of the graphic form is effected by serially updating rasters from a top end of the drawing area to a bottom end thereof and the contents of the drawing Y coordinate register 2 indicates a Y coordinate Y1, the drawing of the graphic form is started from a raster corresponding to the Y coordinate Y1. (As previously described, it is supposed that as a position becomes lower in FIG. 2, Y coordinate of the position increases in value.) At that time, the drawing of the graphic form is inhibited by the clipping judgement unit 14 and the external storage or memory is not accessed at all because the Y coordinate Y1 is less than that indicated by the contents of the clipping Y coordinate register 7. Further, the updating of the raster is controlled by the raster update control unit 20. On the other hand, the Y coordinates are serially updated by the incrementer/decrementer 21, and the contents of the drawing X coordinate register 1 is updated by the drawing X coordinate generation unit 22. When the Y coordinate becomes equal to Yt, the reading of data from the clipping area memory 27 is started. Taking notice of a raster of which the Y coordinate is equal to Y3, X coordinates XL3 and XR3 are given by the clipping area memory 27. Further, it is judged by the clipping judgement unit 14 that the range of the X coordinate of a portion, which can be drawn, is XL3 to XR3, and the drawing of only a part of the graphic form having the X coordinate of this range is allowed. Thus, the clipping processing on this raster is completed.

Upon completion of the processing of clipping a part of the graphic form on a raster, the raster update control unit 20 outputs an update control signal for the next raster. The drawing X coordinate generation unit 22 and the incrementer/decrementer compute new drawing coordinates in response to this signal. Further, two new clipping X coordinates are read out of the clipping area memory 27, and the clipping processing on a raster is performed once again on the next raster. The processing of clipping the graphic form to be drawn is completely effected by performing the above described clipping processing on a raster on all of the rasters. As a result, the processing of clipping the graphic form by using the clipping area or FIG. 2 is completed.

As above described, this embodiment of the present invention can perform the processing of clipping the graphic form by using not only clipping areas defined by the DDA circuits 25 and 26 but also other arbitrary clipping areas, by providing the DDA circuits 25 and 26 and the clipping area memory 27 therein and selecting one of outputs of these elements 25-27. For example, in case where a left and right ends of a clipping area are mostly defined by lines, the DDA circuits are constructed in such a manner to be able to generate only lines. In case where a graphic form is clipped by using a clipping area of which the shape can not be generated or defined by the DDA circuits 25 and 26, data representing such a shape of the clipping area is set in the clipping area memory 27. Thereby, the processing of clipping a graphic form against a clipping area having a shape of high frequency in use can be performed at a high speed. Further, the processing of clipping a graphic form against a clipping area having a shape, of which frequency in use is not high, can be flexibly performed.

While preferred embodiments of the present invention have been described above, it is to be understood that the present invention is not limited thereto and that other modifications will be apparent to those skilled in the art without departing from the spirit of the invention. For instance, in the third embodiment, a memory, to which is referred in accordance with the drawing Y coordinate register 2, is used as the clipping area memory 27. However, taking advantage of the fact that the processing of drawing and clipping a graphic form is serially performed on rasters, a first-in first-out (FIFO) memory (i.e., a pushup storage) may be used as the clipping area memory 27. The scope of the present invention, therefore, is to be determined solely by the appended claims.

What is claimed is:

1. A clipping processor comprising:
   a raster update control unit for controlling update of a raster on which the processing of drawing a part of a graphic form on each raster is performed;
   a drawing X coordinate register for storing an X coordinate of the graphic form to be drawn;
   a drawing Y coordinate register for storing a Y coordinate of the graphic form to be drawn;
   an incrementer/decrementer for incrementing or decrementing the contents of said drawing Y coordinate register in accordance with a control signal outputted from said raster update control unit;
   a drawing X coordinate generation unit for generating a new X coordinate at the time of updating a raster in accordance with the control signal outputted from said raster update control unit and updating an X coordinate of a part of the graphic form to be currently drawn during the same raster and outputting the updated X coordinate to said drawing X coordinate register;
   a first and second clipping Y coordinate registers for storing two Y coordinates defining an area to be clipped;
   a first and second clipping X coordinate registers for storing two X coordinates defining a part of the area to be clipped during a raster;
   a first and second function generation circuits for generating two new X coordinates at the time of updating a raster in accordance with the control signal outputted from said raster update control unit and outputting the two generated X coordinates to said first and second clipping X coordinate registers respectively;
   a first comparator for comparing the contents of said drawing X coordinate register with the contents of said first clipping X coordinate register;
   a second comparator for comparing the contents of said drawing X coordinate register with the contents of said second clipping X coordinate register;
   a third comparator for comparing the contents of said drawing Y coordinate register with the contents of said first clipping Y coordinate register;
   a fourth comparator for comparing the contents of said drawing Y coordinate register with the contents of said second clipping Y coordinate register;
   a drawing area definition flag setting device for setting a drawing area definition flag indicating that an area to be drawn is inside or outside an area to be clipped; and
   a clipping judgment unit for judging from the results of the comparisons made by said first, second, third and fourth comparators and the contents of the drawing area definition flag whether drawing of a graphic form with respect to X coordinates determined by the contents of said drawing X coordinate register and Y coordinates determined by the contents of said drawing Y coordinate register should be permitted or inhibited.

2. A clipping processor comprising:
   a raster update control unit for controlling update of a raster on which the processing of drawing a part of a graphic form on each raster is performed;
   a drawing X coordinate register for storing an X coordinate of the graphic form to be drawn;
   a drawing Y coordinate register for storing a Y coordinate of the graphic form to be drawn;
   an incrementer/decrementer for incrementing or decrementing the contents of said drawing Y coordinate register in accordance with a control signal outputted from said raster update control unit;
   a drawing X coordinate generation unit for generating a new X coordinate at the time of updating a raster in accordance with the control signal outputted from said raster update control unit and updating an X coordinate of a part of the graphic form to be currently drawn during the same raster and outputting the updated X coordinate to said drawing X coordinate register;
   a first and second clipping Y coordinate registers for storing two Y coordinates defining an area to be clipped;
   a first and second clipping X coordinate registers for storing two X coordinates defining a part of the area to be clipped during a raster;
   a first and second digital differential analyzer circuits for generating to new X coordinates at the time of updating a raster in accordance with the control signal outputted from said raster update control unit;
   a first comparator for comparing the contents of said drawing X coordinate register with the contents of said first clipping X coordinate register;
   a second comparator for comparing the contents of said drawing X coordinate register with the contents of said second clipping X coordinate register;
   a third comparator for comparing the contents of said drawing Y coordinate register with the contents of said first clipping Y coordinate register;
   a fourth comparator for comparing the contents of said drawing Y coordinate register with the contents of said second clipping Y coordinate register;
   a drawing area definition flag setting device for setting a drawing area definition flag indicating that an area to be drawn is inside or outside an area to be clipped; and
   a clipping judgment unit for judging from the results of the comparisons made by said first, second, third and fourth comparators and the contents of the drawing area definition flag whether drawing of a graphic form with respect to X coordinates determined by the contents of said drawing X coordinate register and Y coordinates determined by the contents of said drawing Y coordinate register should be permitted or inhibited.

3. A clipping processor comprising:
   a raster update control unit for controlling update of a raster on which the processing of drawing a part of a graphic form on each raster is performed;
   a drawing X coordinate register for storing an X coordinate of the graphic form to be drawn;
   a drawing Y coordinate register for storing a Y coordinate of the graphic form to be drawn;
   an incrementer/decrementer for incrementing or decrementing the contents of said drawing Y coordinate register in accordance with a control signal outputted from said raster update control unit;

a drawing X coordinate generation unit for generating a new X coordinate at the time of updating a raster in accordance with the control signal outputted from said raster update control unit and updating an X coordinate of a part of the graphic form to be currently drawn during the same raster and outputting the updated X coordinate to said drawing X coordinate register;

a first and second clipping Y coordinate registers for storing two Y coordinates defining an area to be clipped;

a first and second clipping X coordinate registers for storing two X coordinates defining a part of the area to be clipped during a raster;

a first and second function generation circuits for generating two new X coordinates at the time of updating a raster in accordance with the control signal outputted from said raster update control unit and outputting the two generated X coordinates to said first and second clipping X coordinate registers respectively;

a clipping area memory for storing two X coordinates defining a part of an area to be clipped on each of rasters;

a first selector for inputting one of two X coordinates outputted from said clipping area memory correspondingly to Y coordinates stored in said drawing Y coordinate register and an output of said first function generation circuit and selectively outputting the inputted X coordinate or the output of said first function generation circuit;

a second selector for inputting an X coordinate, which is one of the two coordinates outputted from said clipping area memory correspondingly to Y coordinates stored in said drawing Y coordinate register and is not inputted to said first selector, and an output of said second function generation circuit and selectively outputting the inputted X coordinate thereto or the output of said second function generation circuit;

a first comparator for comparing the contents of said drawing X coordinate register with the contents of said first clipping X coordinate register;

a second comparator for comparing the contents of said drawing X coordinate register with the contents of said second clipping X coordinate register;

a third comparator for comparing the contents of said drawing Y coordinate register with the contents of said first clipping Y coordinate register;

a fourth comparator for comparing the contents of said drawing Y coordinate register with the contents of said second clipping Y coordinate register;

a drawing area definition flag setting device for setting a drawing area definition flag indicating that an area to be drawn is inside or outside an area to be clipped; and a clipping judgment unit for judging from the results of the comparisons made by said first, second, third and fourth comparators and the contents of the drawing area definition flag whether a drawing of a graphic form with respect to X coordinates determined by the contents of said drawing X coordinate register and Y coordinates determined by the contents of said drawing Y coordinate register should be permitted or inhibited.

* * * * *